United States Patent
Wang et al.

(10) Patent No.: US 10,197,682 B2
(45) Date of Patent: Feb. 5, 2019

(54) TIMING APPARATUS AND METHOD FOR RADIATION DETECTION, MEASUREMENT, IDENTIFICATION AND IMAGING SYSTEM

(71) Applicant: RAYCAN TECHNOLOGY CO., LTD. (CN), Jiangsu (CN)

(72) Inventors: Weidong Wang, Jiangsu (CN); Qingguo Xie, Jiangsu (CN); Yi Shen, Jiangsu (CN)

(73) Assignee: RAYCAN TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 15/319,472

(22) PCT Filed: Dec. 9, 2014

(86) PCT No.: PCT/CN2014/093363
§ 371 (c)(1),
(2) Date: Dec. 16, 2016

(87) PCT Pub. No.: WO2015/192616
PCT Pub. Date: Dec. 23, 2015

(65) Prior Publication Data
US 2017/0322318 A1    Nov. 9, 2017

(30) Foreign Application Priority Data
Jun. 19, 2014   (CN) .......................... 2014 1 0277442

(51) Int. Cl.
*G01T 1/164*    (2006.01)
*G01T 1/20*    (2006.01)
(Continued)

(52) U.S. Cl.
CPC ............ *G01T 1/1648* (2013.01); *G01T 1/172* (2013.01); *G01T 1/208* (2013.01); *G01T 3/06* (2013.01); *G01T 7/00* (2013.01); *G01T 7/005* (2013.01)

(58) Field of Classification Search
CPC ....... G01T 1/1648; G01T 1/172; G01T 1/208; G01T 3/06; G01T 7/005
See application file for complete search history.

(56) References Cited

U.S. PATENT DOCUMENTS 8,274,056 B2    9/2012  Akers et al.
2011/0163238 A1*  7/2011  Teshigawara ............. G01T 1/40
                                                       250/363.03

FOREIGN PATENT DOCUMENTS

CN    101006363    7/2007
CN    101267506    9/2008
(Continued)

OTHER PUBLICATIONS

Chinese Office Action from corresponding Chinese Patent Application No. 20140277442.0 dated Jul. 24, 2017, 6 pages.
(Continued)

*Primary Examiner* — Mark R Gaworecki
(74) *Attorney, Agent, or Firm* — Lee & Hayes, PC

(57) ABSTRACT

A timing apparatus and method for a radiation detection, measurement, identification, and imaging system are disclosed. The apparatus comprises high-energy photon detectors, a light pulse signal generator and an optical fiber. Each high-energy photon detector comprises a scintillation crystal and an optical-to-electrical conversion multiplying device. The high-energy photon detectors are all provided with light transmission holes. Light pulse signals are propagated to the scintillation crystals through the light transmission holes, then propagated to the surfaces of the optical-to-electrical conversion multiplying devices through the scintillation crystals, converted and multiplied by the optical-to-electrical conversion multiplying devices, and processed and read by an electronic circuit. The high-energy photon detectors independent from each other acquire absolute time from the light pulse signals generated by the light pulse generator and timing and calibration are performed between the independent high-energy photon detectors.

8 Claims, 1 Drawing Sheet

(51) Int. Cl.
*G01T 3/06* (2006.01)
*G01T 7/00* (2006.01)
*G01T 1/172* (2006.01)
*G01T 1/208* (2006.01)

(56) References Cited

FOREIGN PATENT DOCUMENTS

| | | |
|---|---|---|
| CN | 102113881 | 7/2011 |
| CN | 103399221 | 11/2013 |
| JP | 61132888 | 6/1986 |
| JP | 6459094 | 3/1989 |
| WO | WO2006018766 | 2/2006 |

OTHER PUBLICATIONS

EP Extended Search Report for corresponding EP Patent Application No. 14894881.3 dated Jul. 28, 2017, 9 pages.
PCT Search Report dated Mar. 24, 2015 from corresponding PCT International Application No. PCT/CN2014/093363, 6 pages.

* cited by examiner

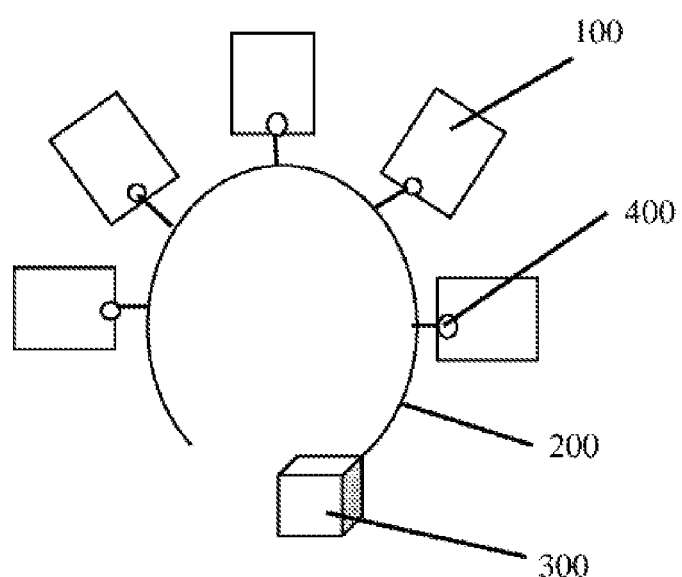

TIMING APPARATUS AND METHOD FOR RADIATION DETECTION, MEASUREMENT, IDENTIFICATION AND IMAGING SYSTEM

TECHNICAL FIELD

The present invention relates to the field of radiation detection, in particular to a timing apparatus and method for a radiation detection, measurement, identification and imaging system.

BACKGROUND

There is a global clock in a PET system in the prior art, that is to say, time command information is sent to various high-energy photon detectors by a total clock. In this way, decoupling and independence of the various high-energy photon detectors are disrupted. Once an increase or decrease in the number of detectors is required, circuit layout and other settings need to be redone in the system, which is complex and inconvenient.

There is thus a need to provide a new timing apparatus and method for a radiation detection, measurement, identification and imaging system, with an aim of addressing the problems of decoupling and independence of the high-energy photon detectors.

SUMMARY

Given this, the present invention provides a timing apparatus for a radiation detection, measurement, identification and imaging system to ensure the decoupling and independence of the high-energy photon detectors.

To achieve the above object of the present invention, provided in the present invention is a timing apparatus for a radiation detection, measurement, identification and imaging system, which includes a plurality of high-energy photon detectors with each including a scintillation crystal, an optical-to-electrical conversion multiplying device and an electronic circuit. The timing apparatus further includes a light pulse generator for emitting light pulse signals and a light conductor for transmitting the light pulse signals, each high-energy photon detector is provided with a light transmission hole for receiving the light pulse signals. The light pulse signals are propagated to the scintillation crystals through the light transmission holes, then propagated to the surfaces of the optical-to-electrical conversion multiplying devices through the scintillation crystals, converted and multiplied by the optical-to-electrical conversion multiplying devices, and processed and read by electronic circuits. The high-energy photon detectors independent from each other acquire absolute time from the light pulse signals generated by the light pulse generator, and timing and calibration are performed between the independent high-energy photon detectors.

In the above timing apparatus for a radiation detection, measurement, identification and imaging system, preferably, the locations of the light transmission holes are disposed on any surface of the scintillation crystals uncoupled with the optical-to-electrical conversion multiplying devices or by the side of any surface of the scintillation crystals uncoupled with the optical-to-electrical conversion multiplying devices.

In the above timing apparatus for a radiation detection, measurement, identification and imaging system, preferably, each high-energy photon detector includes a housing in which the scintillation crystal is arranged and the light transmission hole is formed.

In the above timing apparatus for a radiation detection, measurement, identification and imaging system, preferably, the light conductor is an optical fiber or glass or a crystal or a scintillation crystal.

To achieve the above object of the present invention, further provided in the present invention is a timing apparatus for a radiation detection, measurement, identification and imaging system, which includes a plurality of high-energy photon detectors with each including a scintillation crystal, an optical-to-electrical conversion multiplying device and an electronic circuit. The timing apparatus further includes a light pulse generator for emitting light pulse signals, a light conductor for transmitting the light pulse signals and an optical-to-electrical conversion apparatus for converting the light pulse signals emitted by the light pulse signal generator into electrical signals. The converted electrical signals are processed and read by the electronic circuits. The high-energy photon detectors independent from each other acquire absolute time from the light pulse signals generated by the light pulse generator, and timing and calibration are performed between the independent high-energy photon detectors.

In the above timing apparatus for a radiation detection, measurement, identification and imaging system, preferably, the optical-to-electrical conversion apparatus is directly connected with the electronic circuits, and the converted electrical signals are directly transmitted to the electronic circuits for processing.

In the above timing apparatus for a radiation detection, measurement, identification and imaging system, preferably, the optical-to-electrical conversion apparatus is connected with the optical-to-electrical conversion multiplying devices, and the electrical signals are transmitted through the optical-to-electrical conversion multiplying devices to the electronic circuits for processing.

In the above timing apparatus for a radiation detection, measurement, identification and imaging system, preferably, the optical-to-electrical conversion apparatus is arranged by the side of any surface of the scintillation crystal uncoupled with the optical-to-electrical conversion multiplying device, or by the side of any surface of the optical-to-electrical conversion multiplying device uncoupled with the scintillation crystal.

It is another object of the present invention to provide a timing method for a radiation detection, measurement, identification and imaging system that utilizes the above timing apparatus for a radiation detection, measurement, identification and imaging system for timing. The timing method includes the following steps: S1: a light pulse signal generator emits light pulse signals, the light pulse signals are transmitted through a light conductor to a plurality of high-energy photon detectors, each high-energy photon detector is provided with a light transmission hole for receiving the light pulse signals, and the light pulse signals are propagated through the light transmission holes to scintillation crystals in the high-energy photon detectors; S2: the light pulse signals are transmitted through the scintillation crystals to optical-to-electrical conversion multiplying devices in the high-energy photon detectors and are processed and read by electronic circuits; and S3: the high-energy photon detectors independent from each other acquire absolute time from the light pulse signals generated by the light pulse generator, and timing and calibration are performed between the independent high-energy photon detectors.

In the above timing method for a radiation detection, measurement, identification and imaging system, preferably, in the step S1, the locations of the light transmission holes are disposed on any surface of the scintillation crystals uncoupled with the optical-to-electrical conversion multiplying devices or by the side of any surface of the scintillation crystals uncoupled with the optical-to-electrical conversion multiplying devices.

In the above timing method for a radiation detection, measurement, identification and imaging system, preferably, in the step S1, each high-energy photon detector includes a housing in which the scintillation crystal is arranged and the light transmission hole is formed.

In the above timing method for a radiation detection, measurement, identification and imaging system, preferably, in the step S1, the light conductor is an optical fiber or glass or a crystal or a scintillation crystal.

In the above timing method for a radiation detection, measurement, identification and imaging system, preferably, in the step S3, the method for acquiring and processing the light pulse signals is an acquisition and processing method using multiple voltage thresholds or a constant fraction discriminator or a single voltage threshold triggering and comparison method or direct sampling by direct use of an analog/digital converter.

It is another object of the present invention to provide a timing method for a radiation detection, measurement, identification and imaging system that utilizes the above timing apparatus for a radiation detection, measurement, identification and imaging system for timing. The timing method includes the following steps: S1: a light pulse signal generator emits light pulse signals, the light pulse signals are transmitted through a light conductor to an optical-to-electrical conversion apparatus, the optical-to-electrical conversion apparatus converts the light pulse signals emitted by the light pulse signal generator into electrical signals; S2: the converted electrical signals are directly transmitted to the electronic circuits for processing and reading, or transmitted through the optical-to-electrical conversion multiplying devices in the high-energy photon detectors to the electronic circuits for processing and reading; and S3: the high-energy photon detectors independent from each other finally acquire absolute time from the light pulse signals generated by the light pulse generator, and timing and calibration are performed between the independent high-energy photon detectors.

In the above timing method for a radiation detection, measurement, identification and imaging system, preferably, in the step S1, the light conductor is an optical fiber or glass or a crystal or a scintillation crystal.

In the above timing method for a radiation detection, measurement, identification and imaging system, preferably, in the step S3, the method for acquiring and processing the light pulse signals is an acquisition and processing method using multiple voltage thresholds or a constant fraction discriminator or a single voltage threshold triggering and comparison method or direct sampling by direct use of an analog/digital converter.

The technical solution mentioned above has the following advantages relative to the prior art:

1. The timing apparatus for a radiation detection, measurement, identification and imaging system in the present invention includes a plurality of high-energy photon detectors with each including a scintillation crystal, an optical-to-electrical conversion multiplying device and an electronic circuit. The timing apparatus further includes a light pulse generator for emitting light pulse signals and a light conductor for transmitting the light pulse signals, each high-energy photon detector is provided with a light transmission hole for receiving the light pulse signals, the light pulse signals are propagated to the scintillation crystals through the light transmission holes, then propagated to the surfaces of the optical-to-electrical conversion multiplying devices through the scintillation crystals, converted and multiplied by the optical-to-electrical conversion multiplying devices, and processed and read by electronic circuits. The high-energy photon detectors independent from each other acquire absolute time from the light pulse signals generated by the light pulse generator, then timing and calibration are performed between the independent high-energy photon detectors. In this technical solution, a global clock is eliminated, direct light signals are used to realize timing, an independent component (including the light conductor and the light pulse generator) that can be customized for different systems is used for connection with the high-energy photon detectors, and timing is achieved through the time at which the optical-to-electrical multiplication devices receive the light pulse signals. Thus, decoupling between the high-energy photon detectors can be achieved, the independence of the high-energy photon detectors is ensured, and thus the system can use, increase or decrease the high-energy photon detectors more conveniently. In addition, such a structure is unassociated with the actual positions of the high-energy photon detectors, which is to say, the positions of the high-energy photon detectors can be varied as required, bringing better flexibility in use.

2. The locations of the light transmission holes are disposed on any surface of the scintillation crystals uncoupled with the optical-to-electrical conversion multiplying devices or by the side of any surface of the scintillation crystals uncoupled with the optical-to-electrical conversion multiplying devices. According to this technical solution, by defining the positional relationship between the light transmission hole and the scintillation crystal, it is ensured that light signals can reach the scintillation crystal effectively and directly, reducing the loss of the light signals.

3. Each high-energy photon detector includes a housing in which the scintillation crystal is arranged, and the light transmission hole is disposed on the housing. According to this technical solution, the arrangement of the housing avoids direct punching on the scintillation crystal, so as to ensure the structural integrity of the scintillation crystal and reduce procedures for the scintillation crystal. By arranging an external housing only, the light signals can likewise be transmitted onto the scintillation crystal in a centralized way through the light transmission hole on the housing.

4. The light conductor is an optical fiber or glass or a crystal or a scintillation crystal. These several materials listed in this technical solution are those with good conduction effect, and thus the efficiency of light signal transmission is ensured.

5. The timing apparatus for a radiation detection, measurement, identification and imaging system in the present invention includes a plurality of high-energy photon detectors with each including a scintillation crystal, an optical-to-electrical conversion multiplying device and an electronic circuit. The timing apparatus further includes a light pulse generator for emitting light pulse signals, a light conductor for transmitting the light pulse signals and an optical-to-electrical conversion apparatus for converting the light pulse signals emitted by the light pulse signal generator into electrical signals. The converted electrical signals are processed and read by electronic circuits. The high-energy photon detectors independent from each other acquire absolute time from the light pulse signals generated by the light pulse generator, then timing and calibration are performed between the independent high-energy photon detectors. In this technical solution, a global clock is eliminated, timing is achieved by converting the light signals into the electrical signals, and an optical-to-electrical conversion apparatus is used to convert the light pulse signals into the electrical signals and the electrical signals are then transmitted to the subsequent electronic circuits for processing, so as to achieve timing. Thus, decoupling between the high-energy photon detectors can be achieved, the independence of the high-energy photon detectors is ensured, and thus the system can use, increase or decrease the high-energy photon detectors more conveniently. In addition, such a structure is unassociated with the actual positions of the high-energy photon detectors, which is to say, the positions of the high-energy photon detectors can be varied as required, bringing better flexibility in use.

6. The optical-to-electrical conversion apparatus is directly connected with the electronic circuits, and the converted electrical signals are directly transmitted to the electronic circuits for processing. According to this technical solution, the optical-to-electrical conversion apparatus is directly connected with the electronic circuits, which can ensure the working independence of the optical-to-electrical conversion multiplying devices and completely avoid unnecessary interferences of the timing apparatus itself on the system's components and devices. Furthermore, decoupling, not only between the high-energy photon detectors, but also between the timing apparatus and the system's components and devices, is achieved.

7. The optical-to-electrical conversion apparatus is connected with the optical-to-electrical conversion multiplying devices, and the electrical signals are transmitted through the optical-to-electrical conversion multiplying devices to the electronic circuits for processing. According to this technical solution, the optical-to-electrical conversion apparatus is connected with the optical-to-electrical conversion multiplying devices and thus the optical-to-electrical conversion apparatus can share a path with the optical-to-electrical conversion multiplying devices, so that unnecessary route connections are avoided, thereby structure is simplified and costs are saved.

8. The optical-to-electrical conversion apparatus is arranged by the side of any surface of the scintillation crystal uncoupled with the optical-to-electrical conversion multiplying device, or by the side of any surface of the optical-to-electrical conversion multiplying device uncoupled with the scintillation crystal. According to this technical solution, by limiting the position where the optical-to-electrical conversion apparatus is arranged, the optical-to-electrical conversion apparatus gets closer to the electronic circuits on one hand, and on the other hand, with a reasonable layout, a relatively compact structure is ensured after the timing apparatus is connected with the system and also occupation of excessive spaces is avoided.

9. The timing method for a radiation detection, measurement, identification and imaging system in the present invention in the present invention that utilizes the above timing apparatus for a radiation detection, measurement, identification and imaging system for timing, includes the following steps: S1: a light pulse signal generator emits light pulse signals, the light pulse signals are transmitted through a light conductor to a plurality of high-energy photon detectors, each high-energy photon detector is provided with a light transmission hole for receiving the light pulse signals, and the light pulse signals are propagated through the light transmission holes to scintillation crystals in the high-energy photon detectors; S2: the light pulse signals are transmitted through the scintillation crystals to optical-to-electrical conversion multiplying devices in the high-energy photon detectors and are processed and read by electronic circuits; and S3: the high-energy photon detectors independent from each other acquire absolute time from the light pulse signals generated by the light pulse generator, then timing and calibration are performed between the independent high-energy photon detectors. In this technical solution, a global clock is eliminated, direct light signals are used to realize timing, an independent component (including the light conductor and the light pulse generator) that can be customized for different systems is used for connection with the high-energy photon detectors, and timing is achieved through the time at which the optical-to-electrical multiplication devices receive the light pulse signals. Thus, decoupling between the high-energy photon detectors can be achieved, the independence of the high-energy photon detectors is ensured, and thus the system can use, increase or decrease the high-energy photon detectors more conveniently. In addition, such a structure is unassociated with the actual positions of the high-energy photon detectors, which is to say, the positions of the high-energy photon detectors can be varied as required, bringing better flexibility in use.

10. In the step S1, the locations of the light transmission holes are disposed on any surface of the scintillation crystals uncoupled with the optical-to-electrical conversion multiplying devices or by the side of any surface of the scintillation crystals uncoupled with the optical-to-electrical conversion multiplying devices. According to this technical solution, by defining the positional relationship between the light transmission hole and the scintillation crystal, it is ensured that light signals can reach the scintillation crystal effectively and directly, reducing the loss of the light signals.

11. In the step S3, the method for acquiring and processing the light pulse signals is an acquisition and processing method using multiple voltage thresholds or processing by a constant fraction discriminator or a single voltage threshold triggering comparative method or direct sampling by an analog/digital converter. These few methods have the advantages of good reliability and high efficiency when compared to other methods in the prior art.

12. The timing method for a radiation detection, measurement, identification and imaging system in the present invention that utilizes the above timing apparatus for a radiation detection, measurement, identification and imaging system for timing, includes the following steps: S1: a light pulse signal generator emits light pulse signals, the light pulse signals are transmitted through a light conductor to an optical-to-electrical conversion apparatus, the optical-to-electrical conversion apparatus converts the light pulse signals emitted by the light pulse signal generator into electrical signals; S2: the converted electrical signals are directly transmitted to the electronic circuits for processing and reading, or transmitted through the optical-to-electrical conversion multiplying devices in the high-energy photon detectors to the electronic circuits for processing and reading; and S3: the high-energy photon detectors independent from each other finally acquire absolute time from the light pulse signals generated by the light pulse generator, then timing and calibration are performed between the independent high-energy photon detectors. In this technical solution, a global clock is eliminated, timing is achieved by converting the light signals into the electrical signals, and an optical-to-electrical conversion apparatus is used to convert the light pulse signals into the electrical signals and the electrical signals are then transmitted to the subsequent electronic circuits for processing, so as to achieve timing. Thus, decoupling between the high-energy photon detectors can be achieved, the independence of the high-energy photon detectors is ensured, and thus the system can use, increase or decrease the high-energy photon detectors more conveniently. In addition, such a structure is unassociated with the actual positions of the high-energy photon detectors, which is to say, the positions of the high-energy photon detectors can be varied as required, bringing better flexibility in use.

BRIEF DESCRIPTION OF THE DRAWING

The FIGURE is a schematic diagram of use of an optical fiber embodiment in the timing apparatus for a radiation detection, measurement, identification, and imaging system in the present invention.

DETAILED DESCRIPTION OF THE EMBODIMENTS

Disclosed in the present invention is a timing apparatus for a radiation detection, measurement, identification and imaging system. In this timing apparatus, a global clock is eliminated, timing is achieved, either directly or indirectly, by light signals, the independence of the high-energy photon detectors is ensured, and thus the system can use, increase or decrease the high-energy photon detectors more conveniently. The disclosed timing apparatus includes two embodiments, which will be explained in details hereinafter.

Embodiment 1

Disclosed in the present invention is a timing apparatus for a radiation detection, measurement, identification and imaging system, which includes a plurality of high-energy photon detectors with each including a scintillation crystal, an optical-to-electrical conversion multiplying device and an electronic circuit. The timing apparatus further includes a light pulse generator for emitting light pulse signals and a light conductor for transmitting the light pulse signals, each high-energy photon detector is provided with a light transmission hole for receiving the light pulse signals. The light pulse signals are propagated to the scintillation crystals through the light transmission holes, then propagated to the surfaces of the optical-to-electrical conversion multiplying devices through the scintillation crystals, converted and multiplied by the optical-to-electrical conversion multiplying devices, just as photons within the reception spectra of the optical-to-electrical conversion multiplying devices generated by reaction of the high-energy photons and the scintillation crystals, and processed and read by electronic circuits. The high-energy photon detectors independent from each other acquire absolute time from the light pulse signals generated by the light pulse generator, and timing and calibration are performed between the independent high-energy photon detectors. The timing apparatus is used in scenarios where a radiation detection, measurement, identification and imaging system needs to be subjected to absolute timing and calibration and where time coincidence is necessitated between the independent high-energy photon detectors. According to the timing apparatus for a radiation detection, measurement, identification and imaging system disclosed in embodiment 1, a global clock is eliminated, direct light signals are used to realize timing, an independent component (including the light conductor and the light pulse generator) that can be customized for different systems is used for connection with the high-energy photon detectors, and timing is achieved through the time at which the optical-to-electrical multiplication devices receive the light pulse signals. Thus, decoupling between the high-energy photon detectors can be achieved, the independence of the high-energy photon detectors is ensured, and thus the system can use, increase or decrease the high-energy photon detectors more conveniently. In addition, such a structure is unassociated with the actual positions of the high-energy photon detectors, which is to say, the positions of the high-energy photon detectors can be varied as required, bringing better flexibility in use.

In the timing apparatus of embodiment 1, the light transmission hole may be sheltered for non-light transmission purposes when the mode of timing in the present invention is not used or partially used.

In the timing apparatus of embodiment 1, the locations of the light transmission holes are disposed on any surface of the scintillation crystals uncoupled with the optical-to-electrical conversion multiplying devices or by the side of any surface of the scintillation crystals uncoupled with the optical-to-electrical conversion multiplying devices. That is to say, the light transmission holes may be directly formed in the scintillation crystals, or may be formed outside of the scintillation crystals. For instance, the high-energy photon detector generally includes a housing in which the scintillation crystals are arranged and in which the light transmission holes are formed. Certainly, as mentioned hereinabove, the light transmission holes may also be directly formed in the scintillation crystals in order to further ensure the intensity of the light signals received by the scintillation crystals. The positions where the light transmission holes are formed need to ensure that the light signals can reach the scintillation crystals effectively and directly, reducing the loss of the light signals.

In the timing apparatus of embodiment 1 of the present invention, a light pulse signal amplifier may be arranged. The light pulse signal amplifier may amplify a weak light pulse signal and then fully ensure that a photoelectric multiplier can receive this light pulse signal. It is preferable that the light pulse signal amplifier is arranged at a location where the light conductor is joined with the high-energy photon detector, i.e. arranged in the vicinity of the outside of the light transmission hole. Upon receipt of the light pulse signal transmitted by an optical fiber, the light pulse signal amplifier directly amplifies the light pulse signal; after this, the amplified light pulse signal is transmitted through the light transmission hole to the scintillation crystal, and then the light pulse signal is transmitted through the scintillation crystal to the photoelectric multiplier. The light pulse signal amplifier may also be arranged in the vicinity of the inner side of the light transmission hole. The light pulse signal is firstly incident to the light transmission hole and then amplified by the light pulse signal amplifier; afterwards, the amplified light pulse signal is transmitted through the scintillation crystal to the photoelectric multiplier. It is undoubted that the light pulse signal amplifier may also be arranged between the scintillation crystal and the photoelectric multiplier, so that the light pulse signal is amplified after passing through the scintillation crystal and then transmitted to the photoelectric multiplier.

This embodiment of the present invention can be described in conjunction with the accompanying drawing.

As shown in the FIGURE, the timing apparatus for a radiation detection, measurement, identification and imaging system disclosed in the present invention includes a plurality of high-energy photon detectors 100 and a plurality of photoelectric multipliers (not shown). The timing apparatus for a radiation detection, measurement, identification and imaging system includes an optical fiber 200 surrounding the plurality of high-energy photon detectors 100 and a light pulse signal generator 300 providing light pulse signals to the optical fiber 200, which both are designed according to the system. Each of the high-energy photon detectors 100 is provided thereon with a light transmission hole 400 for receiving the light pulse signals, and the light pulse signals are directly transmitted to the photoelectric multipliers through the light transmission holes 400.

Embodiment 2

Also disclosed in the present invention is a timing apparatus for a radiation detection, measurement, identification and imaging system, which includes a plurality of high-energy photon detectors with each including a scintillation crystal, an optical-to-electrical conversion multiplying device and an electronic circuit. The timing apparatus further includes a light pulse generator for emitting light pulse signals, a light conductor for transmitting the light pulse signals and an optical-to-electrical conversion apparatus for converting the light pulse signals emitted by the light pulse signal generator into electrical signals. The converted electrical signals are processed and read by the electronic circuits. The high-energy photon detectors independent from each other acquire absolute time from the light pulse signals generated by the light pulse generator, and timing and calibration are performed between the independent high-energy photon detectors. In this technical solution, a global clock is eliminated, timing is achieved by converting the light signals into the electrical signals, and an optical-to-electrical conversion apparatus is used to convert the light pulse signals into the electrical signals and the electrical signals are then transmitted to the subsequent electronic circuits for processing, so as to achieve timing. Thus, decoupling between the high-energy photon detectors can be achieved, the independence of the high-energy photon detectors is ensured, and thus the system can use, increase or decrease the high-energy photon detectors more conveniently. In addition, such a structure is unassociated with the actual positions of the high-energy photon detectors, which is to say, the positions of the high-energy photon detectors can be varied as required, bringing better flexibility in use. According to the timing apparatus for a radiation detection, measurement, identification and imaging system disclosed in embodiment 2, a global clock is eliminated, timing is achieved by converting the light signals into the electrical signals, and an optical-to-electrical conversion apparatus is used to convert the light pulse signals into the electrical signals and the electrical signals are then transmitted to the subsequent electronic circuits for processing, so as to achieve timing. Thus, decoupling between the high-energy photon detectors can be achieved, the independence of the high-energy photon detectors is ensured, and thus the system can use, increase or decrease the high-energy photon detectors more conveniently. In addition, such a structure is unassociated with the actual positions of the high-energy photon detectors, which is to say, the positions of the high-energy photon detectors can be varied as required, bringing better flexibility in use.

In the timing apparatus of embodiment 2, under one situation, the optical-to-electrical conversion apparatus is directly connected with the electronic circuits, and the converted electrical signals are directly transmitted to the electronic circuits for processing. According to this technical solution, the optical-to-electrical conversion apparatus is directly connected with the electronic circuits, which can ensure the working independence of the optical-to-electrical conversion multiplying devices and completely avoid unnecessary interferences of the timing apparatus itself on the system's components and devices. Furthermore, decoupling, not only between the high-energy photon detectors, but between the timing apparatus and the system's components and devices, is achieved.

In the timing apparatus of embodiment 2, under another situation, the optical-to-electrical conversion apparatus is connected with the optical-to-electrical conversion multiplying devices, and then the electrical signals are transmitted through the optical-to-electrical conversion multiplying devices to the electronic circuits for processing. According to this technical solution, the optical-to-electrical conversion apparatus is connected with the optical-to-electrical conversion multiplying devices and thus the optical-to-electrical conversion apparatus can share a path with the optical-to-electrical conversion multiplying devices, so that unnecessary route connections are avoided, structure is simplified and costs are saved.

In the timing apparatus of embodiment 2, the optical-to-electrical conversion apparatus is arranged by the side of any surface of the scintillation crystal uncoupled with the optical-to-electrical conversion multiplying device, or by the side of any surface of the optical-to-electrical conversion multiplying device uncoupled with the scintillation crystal. The specific position where the optical-to-electrical conversion apparatus is arranged is dictated by the layout of a PET system. According to this technical solution, by limiting the position where the optical-to-electrical conversion apparatus is arranged, the optical-to-electrical conversion apparatus gets closer to the electronic circuits on one hand, and on the other hand, with a reasonable layout, a relatively compact structure is ensured after the timing apparatus is connected with the system and also occupation of excessive spaces is avoided.

The timing apparatus of embodiment 2 of the present invention may also use a light pulse signal amplifier, which is arranged at a light receiving end of the optical-to-electrical conversion apparatus to amplify the light pulse signals emitted by the light pulse signal generator at first and then transmit the amplified light pulse signals to the optical-to-electrical conversion apparatus for being converted into electrical signals. For strong light signals, the quality of the converted electrical signals can be ensured, thereby ensuring the timing effect.

The light pulse signal amplifier may amplify a weak light pulse signal and then fully ensure that a photoelectric multiplier can receive this light pulse signal. It is preferable that the light pulse signal amplifier is arranged at a location where the light conductor is joined with the high-energy photon detector, i.e. arranged in the vicinity of the outside of the light transmission hole. Upon receipt of the light pulse signal transmitted by an optical fiber, the light pulse signal amplifier directly amplifies the light pulse signal; after this, the amplified light pulse signal is transmitted through the light transmission hole to the scintillation crystal, and then the light pulse signal is transmitted through the scintillation crystal to the photoelectric multiplier. The light pulse signal amplifier may also be arranged in the vicinity of the inner side of the light transmission hole. The light pulse signal is firstly incident to the light transmission hole and then amplified by the light pulse signal amplifier; afterwards, the amplified light pulse signal is transmitted through the scintillation crystal to the photoelectric multiplier. It is undoubted that the light pulse signal amplifier may also be arranged between the scintillation crystal and the photoelectric multiplier, so that the light pulse signal is amplified after passing through the scintillation crystal and then transmitted to the photoelectric multiplier.

In the timing apparatus of the above embodiments 1 and 2 of the present invention, the light conductor may be a material with good conduction effect, such as optical fiber or glass or crystal or scintillation crystal, so as to ensure the efficiency of light signal transmission. Other unlisted materials, though having common conduction effects, still all fall within the scope of protection of the light conductor of the present invention as long as they are materials capable of transmitting light signals.

In the timing apparatus of the above embodiments 1 and 2 of the present invention, one end of the light conductor is connected with the light pulse generator, while the other end of the light conductor has a plurality of branches, with each being connected with one high-energy photon detector. One light pulse emitted by the light pulse generator can be received by the plurality of branches and transmitted to the high-energy photon detectors connected with the various branches. The plurality of branches may be a branch formed according to the own design of the same light conductor, and may also be an externally-connected branch element. No matter which design form for the branch is adopted, there exists an effect of transmitting the light pulse signals. The arrangement of the light conductor is determined on the basis of the actual condition of the apparatus, with the aim of high aesthetic sense and great convenience in connection.

As is not shown in embodiment 2, each of the high-energy photon detectors of embodiment 2 is cooperatively provided with an optical-to-electrical conversion apparatus for converting the light pulse signals emitted by the light pulse signal generator into electrical signals. As a preferred embodiment, the optical-to-electrical conversion apparatus is preferably directly connected with the electronic circuits, and the converted electrical signals are directly transmitted to the electronic circuits for processing. Certainly, as another preferred embodiment, the optical-to-electrical conversion apparatus may also be connected with the optical-to-electrical conversion multiplying devices, and then the electrical signals are transmitted through the optical-to-electrical conversion multiplying devices to the electronic circuits for processing. Embodiment 2 differs from embodiment 1 in that an optical-to-electrical conversion apparatus is arranged but the light transmission holes are not arranged, and that the light pulse signals are converted into electrical signals and then the electrical signals are transmitted to the photoelectric multipliers, which directly transmit the electrical signals to the electronic circuit for processing purposes.

Also disclosed in the present invention is a timing method for a radiation detection, measurement, identification and imaging system. In this timing method, a global clock is eliminated, timing is achieved, either directly or indirectly, by use of light signals, the independence of the high-energy photon detectors is ensured, and thus the system can use, increase or decrease the high-energy photon detectors more conveniently. The disclosed timing method includes two embodiments, which will be explained in details hereinafter.

Embodiment 1

Also disclosed in the present invention is a timing method for a radiation detection, measurement, identification and imaging system, which includes the following steps:

S1: a light pulse signal generator emits light pulse signals, the light pulse signals are transmitted through a light conductor to high-energy photon detectors, each high-energy photon detector is provided with a light transmission hole for receiving the light pulse signals, and the light pulse signals are propagated through the light transmission holes to scintillation crystals in the high-energy photon detectors;

S2: the light pulse signals are transmitted through the scintillation crystals to optical-to-electrical conversion multiplying devices in the high-energy photon detectors and are processed and read by electronic circuits; and S3: the high-energy photon detectors independent from each other acquire precise absolute time from the light pulse signals generated by the light pulse generator, and timing and calibration are performed between the independent high-energy photon detectors.

According to the technical solution of the method in embodiment 1, a global clock is eliminated, direct light signals are used to realize timing, an independent component (including the light conductor and the light pulse generator) that can be customized for different systems is used for connection with the high-energy photon detectors, and timing is achieved through the time at which the optical-to-electrical multiplication devices receive the light pulse signals. Thus, decoupling between the high-energy photon detectors can be achieved, the independence of the high-energy photon detectors is ensured, and thus the system can use, increase or decrease the high-energy photon detectors more conveniently. In addition, such a structure is unassociated with the actual positions of the high-energy photon detectors, which is to say, the positions of the high-energy photon detectors can be varied as required, bringing better flexibility in use.

In the step S1, the locations of the light transmission holes are disposed on any surface of the scintillation crystals uncoupled with the optical-to-electrical conversion multiplying devices or by the side of any surface of the scintillation crystals uncoupled with the optical-to-electrical conversion multiplying devices. According to this technical solution, by defining the positional relationship between the light transmission hole and the scintillation crystal, it is ensured that light signals can reach the scintillation crystal effectively and directly, reducing the loss of the light signals.

In the step S1, each high-energy photon detector includes a housing in which the scintillation crystal is arranged and the light transmission hole is formed. Use of the housing avoids direct punching on the scintillation crystal, so as to ensure the structural integrity of the scintillation crystal and reduce the number of processing procedures for the scintillation crystal. By arranging an external housing only, the light signals can likewise be transmitted onto the scintillation crystal in a centralized way through the light transmission hole on the housing. And the structure is simple.

In the step S1, the light conductor is an optical fiber or glass or a crystal or a scintillation crystal. Those materials with good conduction effects ensure the efficiency of light signal transmission.

In the step S3, the method for acquiring and processing the light pulse signals is an acquisition and processing method using multiple voltage thresholds or a constant fraction discriminator or a single voltage threshold triggering and comparison method or direct sampling by direct use of an analog/digital converter. These few methods have the advantages of good reliability and high efficiency when compared to other methods in the prior art.

In the step S1, the light pulse signals have a wavelength range of 300 nm to 1550 nm. The wavelengths of the commonly used light pulse signals are centered about some wavelength ranges. These wavelength ranges are also customarily known as windows, and at present there are three commonly-used low-loss windows centered on 850 nm, 1310 nm and 1550 nm. The light pulse signals have a light pulse width range of 10 ps to 100 ns.

The timing method for a radiation detection, measurement, identification and imaging system in embodiment 1 of the present invention may also use a light pulse signal amplifier. The light pulse signal amplifier may amplify a weak light pulse signal and then fully ensure that a photoelectric multiplier can receive this light pulse signal. It is preferable that the light pulse signal amplifier is arranged at a location where the light conductor is joined with the high-energy photon detector, i.e. arranged in the vicinity of the outside of the light transmission hole. Upon receipt of the light pulse signal transmitted by an optical fiber, the light pulse signal amplifier directly amplifies the light pulse signal; after this, the amplified light pulse signal is transmitted through the light transmission hole to the scintillation crystal, and then the light pulse signal is transmitted through the scintillation crystal to the photoelectric multiplier. The light pulse signal amplifier may also be arranged in the vicinity of the inner side of the light transmission hole. The light pulse signal is firstly incident to the light transmission hole and then amplified by the light pulse signal amplifier; afterwards, the amplified light pulse signal is transmitted through the scintillation crystal to the photoelectric multiplier. It is undoubted that the light pulse signal amplifier may also be arranged between the scintillation crystal and the photoelectric multiplier, so that the light pulse signal is amplified after passing through the scintillation crystal and then transmitted to the photoelectric multiplier.

Embodiment 2

Also disclosed in the present invention is a timing method for a radiation detection, measurement, identification and imaging system, which includes the following steps:

S1: a light pulse signal generator emits light pulse signals, the light pulse signals are transmitted through a light conductor to an optical-to-electrical conversion apparatus, the optical-to-electrical conversion apparatus converts the light pulse signals emitted by the light pulse signal generator into electrical signals;

S2: the converted electrical signals are directly transmitted to the electronic circuits for processing and reading, or transmitted through the optical-to-electrical conversion multiplying devices in the high-energy photon detectors to the electronic circuits for processing and reading; and S3: the high-energy photon detectors independent from each other finally acquire absolute time from the light pulse signals generated by the light pulse generator, and timing and calibration are performed between the independent high-energy photon detectors.

In the step S1, the light conductor is an optical fiber or glass or a crystal or a scintillation crystal. These several materials listed in this technical solution are those with good conduction effects, and thus the efficiency of light signal transmission is ensured.

According to the technical solution of embodiment 2, a global clock is eliminated, timing is achieved by converting the light signals into the electrical signals, and an optical-to-electrical conversion apparatus is used to convert the light pulse signals into the electrical signals and the electrical signals are then transmitted to the subsequent electronic circuits for processing, so as to achieve timing. Thus, decoupling between the high-energy photon detectors can be achieved, the independence of the high-energy photon detectors is ensured, and thus the system can use, increase or decrease the high-energy photon detectors more conveniently. In addition, such a structure is unassociated with the actual positions of the high-energy photon detectors, which is to say, the positions of the high-energy photon detectors can be varied as required, bringing better flexibility in use.

In the step S3, the method for acquiring and processing the light pulse signals is an acquisition and processing method using multiple voltage thresholds or a constant fraction discriminator or a single voltage threshold triggering and comparison method or direct sampling by direct use of an analog/digital converter.

The timing method of embodiment 2 of the present invention may also use a light pulse signal amplifier, which is arranged at a light receiving end of the optical-to-electrical conversion apparatus to amplify the light pulse signals emitted by the light pulse signal generator at first and then transmit the amplified light pulse signals to the optical-to-electrical conversion apparatus for being converted into electrical signals. For strong light signals, the quality of the converted electrical signals can be ensured, thereby ensuring the timing effect.

In all the above embodiments of the apparatus and method of the present invention, to ensure timing accuracy as well as no influence of the light pulse signals upon the positions, time and energy information of γ photons of a PET system itself during deposition in the high-energy photon detectors, the light pulse signals are those that do not react with the high-energy photon detectors and are directly transmitted through the high-energy photon detectors to the photoelectric multipliers. In all the above embodiments of the apparatus and method of the present invention, to ensure that the light pulse signals can be accurately transmitted to the photoelectric multipliers, the light pulse signals have a wavelength range of 300 nm to 1550 nm. The wavelengths of the light pulse signals may be selected as 300 nm, 400 nm, 450 nm, 500 nm, 550 nm, 600 nm, 650 nm, 700 nm, 850 nm, 1310 nm and 1550 nm.

In all the above embodiments of the apparatus and method of the present invention, to ensure that the light pulse signals can be accurately transmitted to the photoelectric multipliers, the light pulse signals have a light pulse width range of 10 ps to 100 ns. The light pulse width may be selected as 10 ns, 20 ns, 30 ns, 40 ns, 50 ns, 60 ns, 70 ns, 80 ns, 90 ns and 100 ns.

In the embodiments of the apparatus and method stated above, the length of the optical fiber is not defined. The specific length of the optical fiber needs to be reasonably set depending on the arrangement of the high-energy photon detectors. The accuracy of information regarding the time at which the photoelectric multiplier receives the light pulse signals needs to be taken into consideration while setting the length of the optical fiber.

The mode of arrangement of the optical fiber is not particularly defined in the present invention. The actual arrangement of the optical fiber is dictated by the arrangement of the high-energy photon detectors in the system. For example, when the plurality of high-energy photon detectors are arranged in an annular layout, the optical fiber may also be arranged annularly around the plurality of high-energy photon detectors.

Optical fiber is applied in the embodiment shown in the accompanying drawing of the present invention, and certainly can also be replaced by glass or a crystal or a scintillation crystal, etc.

Global clock is eliminated in the present invention. The first technical solution of the present invention is as follows: an independent component (including the light conductor and the light pulse generator) that can be customized for different systems is used for connection with the high-energy photon detectors, and timing is achieved through the time at which the optical-to-electrical multiplication devices receive the light pulse signals. Thus, decoupling between the high-energy photon detectors can be achieved. And the second technical solution is that an optical-to-electrical conversion apparatus is used for converting the light pulse signals into electrical signals, and then the electrical signals are transmitted to the subsequent electronic circuits for processing. These two technical solutions ensure the independence of the high-energy photon detectors, and thus the system can use, increase or decrease the high-energy photon detectors more conveniently. In addition, such a structure is unassociated with the actual positions of the high-energy photon detectors, which is to say, the positions of the high-energy photon detectors can be varied as required, bringing better flexibility in use. Besides, the parts of the timing apparatus are those commonly used in the prior art and are conveniently available on the market accordingly.

The invention claimed is:

1. A timing apparatus for a radiation detection, measurement, identification and imaging system, which comprises a plurality of high-energy photon detectors with each comprising a scintillation crystal, an optical-to-electrical conversion multiplying device and an electronic circuit, characterized in that the timing apparatus further comprises a light pulse generator for emitting light pulse signals and a light conductor for transmitting the light pulse signals, each high-energy photon detector is provided with a light transmission hole for receiving the light pulse signals, the light pulse signals are propagated to the scintillation crystals through the light transmission holes, then propagated to the surfaces of the optical-to-electrical conversion multiplying devices through the scintillation crystals, converted and multiplied by the optical-to-electrical conversion multiplying devices, and processed and read by the electronic circuits, the high-energy photon detectors independent from each other acquire absolute time from the light pulse signals generated by the light pulse generator, and timing and calibration are performed between the independent high-energy photon detectors; and the locations of the light transmission holes are disposed on any surface of the scintillation crystals uncoupled with the optical-to-electrical conversion multiplying devices or by the side of any surface of the scintillation crystals uncoupled with the optical-to-electrical conversion multiplying devices.

2. The timing apparatus for a radiation detection, measurement, identification and imaging system according to claim 1, characterized in that each high-energy photon detector comprises a housing in which the scintillation crystal is arranged and the light transmission hole is formed.

3. The timing apparatus for a radiation detection, measurement, identification and imaging system according to claim 1, characterized in that the light conductor is optical fiber or glass or crystal or scintillation crystal.

4. A timing method for a radiation detection, measurement, identification and imaging system, characterized by comprising the following steps:
   S1: a light pulse signal generator emits light pulse signals, the light pulse signals are transmitted through a light conductor to a plurality of high-energy photon detectors, each high-energy photon detector is provided with a light transmission hole for receiving the light pulse signals, the locations of the light transmission holes are disposed on any surface of the scintillation crystals uncoupled with the optical-to-electrical conversion multiplying devices or by the side of any surface of the scintillation crystals uncoupled with the optical-to-electrical conversion multiplying devices, and the light pulse signals are propagated through the light transmission holes to scintillation crystals in the high-energy photon detectors;
   S2: the light pulse signals are transmitted through the scintillation crystals to optical-to-electrical conversion multiplying devices in the high-energy photon detectors and are processed and read by electronic circuits; and
   S3: the high-energy photon detectors independent from each other acquire absolute time from the light pulse signals generated by the light pulse generator, and timing and calibration are performed between the independent high-energy photon detectors.

5. The timing method for a radiation detection, measurement, identification and imaging system according to claim 4, characterized in that in the step S1, the locations of the light transmission holes are disposed on any surface of the scintillation crystals uncoupled with the optical-to-electrical conversion multiplying devices or by the side of any surface of the scintillation crystals uncoupled with the optical-to-electrical conversion multiplying devices.

6. The timing method for a radiation detection, measurement, identification and imaging system according to claim 4, characterized in that in the step S1, each high-energy photon detector comprises a housing in which the scintillation crystal is arranged and the light transmission hole is formed.

7. The timing method for a radiation detection, measurement, identification and imaging system according to claim 4, characterized in that in the step S1, the light conductor is optical fiber or glass or crystal or scintillation crystal.

8. The timing method for a radiation detection, measurement, identification and imaging system according to claim 4, characterized in that in the step S3, the method for acquiring and processing the light pulse signals is an acquisition and processing method using multiple voltage thresholds or a constant fraction discriminator or a single voltage threshold triggering and comparison method or direct sampling by direct use of an analog/digital converter.

* * * * *